United States Patent [19]

Buzzoni et al.

[11] Patent Number: 5,395,578
[45] Date of Patent: Mar. 7, 1995

[54] METHOD FOR SLUSH MOLDING ARTICLES, OF TWO OR MORE COLORS FROM THERMOPLASTIC, THERMOSETTING OR ELASTOMERIC RESINS IN POWDER FORM

[75] Inventors: Giancarlo Buzzoni, Barasso; Paolo Cittadini, Varese, both of Italy

[73] Assignee: Industrie Ilpea S.p.A., Malgesso, Italy

[21] Appl. No.: 83,514

[22] Filed: Jun. 30, 1993

Related U.S. Application Data

[63] Continuation-in-part of Ser. No. 758,106, Sep. 12, 1991, Pat. No. 5,234,653.

[30] Foreign Application Priority Data

Sep. 17, 1990 [IT] Italy .................. 21488/90

[51] Int. Cl.$^6$ ................. B29C 41/22; B29C 41/18
[52] U.S. Cl. .................... 264/245; 264/255; 264/302
[58] Field of Search .......... 264/245, 255, 301, 302, 264/304, 306, 310, 332, 334, DIG. 60; 425/DIG. 47, 134, 256, 425, 434, 435

[56] References Cited

U.S. PATENT DOCUMENTS

| | | | |
|---|---|---|---|
| 2,736,925 | 3/1956 | Heisler et al. | 18/55 |
| 2,915,788 | 12/1959 | Engel | 18/58 |
| 3,004,297 | 10/1961 | Stover | 264/163 |
| 3,039,146 | 6/1962 | Engel | 18/38 |
| 4,562,025 | 12/1985 | Gray | 264/DIG. 60 X |
| 4,610,620 | 9/1986 | Gray | 425/434 |
| 4,634,360 | 1/1987 | Gray | 425/130 |
| 4,643,863 | 2/1987 | Martini | 264/275 X |
| 4,683,098 | 7/1987 | Belleville et al. | 264/302 |
| 4,716,003 | 12/1987 | Grandreau | 264/302 |
| 4,755,339 | 7/1988 | Reilly et al. | 264/275 X |
| 4,790,510 | 12/1988 | Takamatsu et al. | 264/302 X |
| 4,792,425 | 12/1988 | Weaver | 264/328.8 X |
| 4,822,438 | 4/1989 | Williams et al. | 264/303 X |
| 4,882,173 | 11/1989 | Laroche et al. | 264/245 X |
| 4,925,151 | 5/1990 | Gray | 264/245 X |
| 4,999,147 | 3/1991 | Yojima et al. | 264/252 X |
| 5,033,954 | 7/1991 | Kargarzadeh | 264/245 X |
| 5,046,941 | 9/1991 | Batchelder et al. | 264/245 X |
| 5,074,773 | 12/1991 | Tischler | 425/425 X |
| 5,137,679 | 8/1992 | Tibbetts et al. | 264/302 |
| 5,225,214 | 7/1993 | Filion | 264/245 X |

FOREIGN PATENT DOCUMENTS

| | | | |
|---|---|---|---|
| 0159309 | 9/1984 | Japan | 264/245 |
| 01468 | 4/1985 | WIPO | 264/252 |

OTHER PUBLICATIONS

Cenni, G. et al., "Plu cruscotti pregiati con il sistama slush-moulding", *PLAST,* pp. 175–177 (1979).
Park, R. A., "Plasticol Processing", *Modern Plastics Encyclopedia,* pp. 340, (1977–1978).
Pabst, H. G., "Development and Large-Scale Use of a Dashboard Produced by Slush Moulding PVC" (AUDI) Mannheim VDI Conference, pp. 139–166 (1987).
Khue, N. N. et al., "Development of Optimum Powder Blends for Slush Moulding", IVth International Conference PVC '90–Apr. 24–26, 1990.
Ball, W., et al., "New Requirements for Car Interior Trims", (BMW) Mannheim VDI Conference, pp. 1–18.

*Primary Examiner*—Jan H. Silbaugh
*Attorney, Agent, or Firm*—Foley & Lardner

[57] ABSTRACT

An apparatus including of a mold for slush molding articles of a least two colors; a tank; a separation wall disposed in the tank and dividing the tank into two spaces; a gasket mounted on a free edge of the separation wall which faces the mold, the gasket having a plurality of rigid inserts disposed therein in a predetermined distribution; and an actuator device which expands and retracts the rigid inserts thereby correspondingly expanding and retracting the gasket. A method for slush molding utilizes the apparatus.

5 Claims, 6 Drawing Sheets

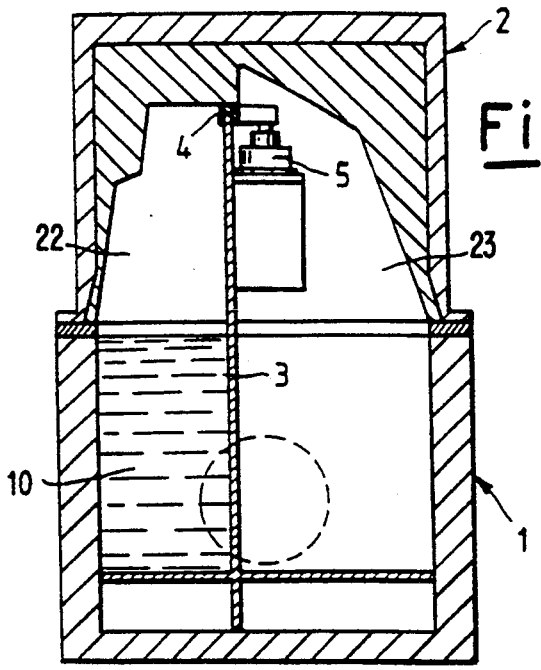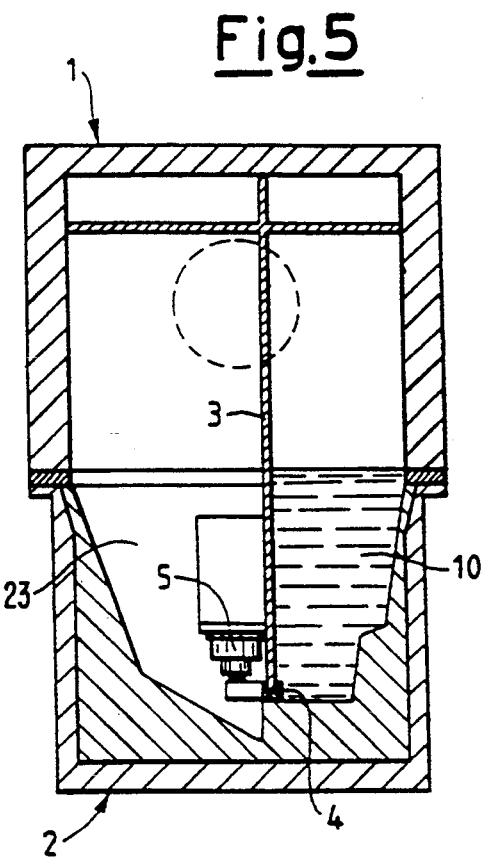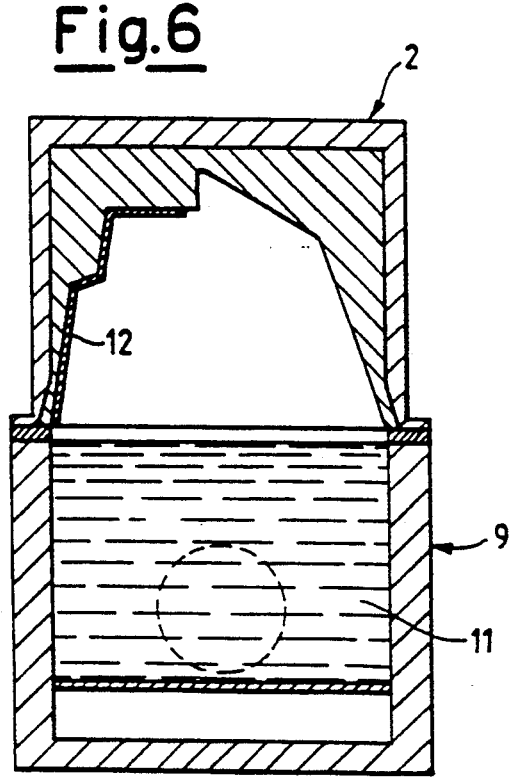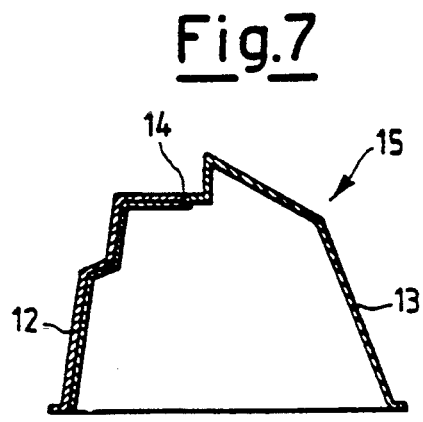

METHOD FOR SLUSH MOLDING ARTICLES, OF TWO OR MORE COLORS FROM THERMOPLASTIC, THERMOSETTING OR ELASTOMERIC RESINS IN POWDER FORM

CROSS-REFERENCE TO RELATED APPLICATIONS

This application is a continuation-in-part of United States application Ser. No. 07/758,106, filed Sep. 12, 1991, now U.S. Pat. No. 5,234,653.

BACKGROUND OF THE INVENTION

The method of slush molding plastisol or PVC powder or other materials is generally known and is described in the literature, of which the following examples can be cited:
1) "PLAST"—Sept. 1979 pp 175–177.
2) "MODERN PLASTIC ENCYCLOPEDIA" 1977–1978 pp 340 onwards.
3) BALL W., Ziebart W., Woite B. (BMW) Mannheim VDI conference "New Requirement for Car Interior Trim" pp 1–18.
4) Pabst H. G., Shaper S., Schmidt H., Terveen A. (AUDI) Mannheim VDI Conference 1987—"- Development and large-scale use of dashboards produced by Slush Molding PVC".
5) Khue N. N., Kunpers-Martz M., Dankmeier O. (EVC) "Development of optimum powder-blend for slush molding" IVth International Conference PVC '90-24-26 April 1990, Brighton U. K., pp 31/1-31/14.

FR-A-1,439,028 (Rhone Poulenc), CH-A-293,508 (J. Croning), FR-A-1,075,378 (Telegraph Construction), FR-A-1,381,850 (Gosudarstvenny),
GB-A-905,546 (Plastomatic)
U.S. Pa. No.-A-2,736,925 (J. S. Heisler),
FR-A-1,131,153 (National Research),
GB-A-1,337,962 (Aquitaine Total),
GB-A-1,056,109 (Celanese),
U.S. Pat. No.-A-3,039,146 (T. Hengel.),
U.S. Pat. No.-A-2,915,788 (T. Hengel),
GB-A-865,608 (T. Hengel),
FR-A-916,055 (ICI),
GB-A-1,025,493 (M. F. Smith),
FR-A-1,560,675 (Goodyear Tire),
DE-A-1,554,967 (Vaessen-Schemaker),
IT-A-22197 A/80 (ILPEA),
DE-A-3,417,727 (YMOS).

All these patents or articles describe a substantially similar process, briefly consisting of filling a preheated metal mold with polymer liquid or powder, removing the excess liquid or solid and then heating the mold to complete gelling or fusion of the material which has adhered to it. The mold is then cooled and the final molding extracted.

In the sector involving such articles, a problem has recently appeared when trying to obtain a finished product, such as simulated leather for trimming an automobile dashboard, having two or more sharply divided colors in the exposed part of the molding.

SUMMARY OF THE INVENTION

An object of the present invention is to form articles such as thermoplastic, thermosetting or elastomeric resin based simulated leathers or the like, of the type which are moldable in an open top mold, such that they comprise two or more different colors in their exposed part, i.e., that part which adheres to the inner surface of the mold.

The above object is attained according to the invention by a method for slush molding two-color articles such as simulated leathers or the like from materials chosen from the group of thermoplastic, thermosetting and elastomeric resins in powder form, and includes the following steps:

a) molding a gasket which substantially reproduces as such or slightly modified the profile of the mold along a line thereof which defines on the molded article the corresponding separation line between two different colors, b) providing on the inside of the mold along the separation line at least one dividing wall to define two separated half spaces inside the mold, c) fixing the gasket onto the dividing wall in proximity to the mold to form a seal within the mold between the two half-spaces, d) slush molding a layer of a first material constituting the first of the two different colors, the layer adhering to the mold only on the walls of the first half-space defined within it, e) consolidating the layer of the first material adhering to the mold, f) removing the dividing wall and the relative gasket from the mold, g) slush molding a continuous layer of a second material constituting the second of the two or more colors, and repeating the process according to the number of colors required.

In stage d) of the aforesaid method, the material is left in contact with the mold for the time required for it to adhere and partly gel or melt in the part relating to the first color.

The sealing performed by the gasket if necessary can be improved by suitable means, such as for instance by applying vacuum to the system. The mold is then emptied of the excess (powder) material, the gasket is removed and a further filling of material of the second color is made within the shortest possible time. The second color material is left in contact with the hot mold for the required time depending on the thickness to be obtained, and the excess is then removed.

The mold is heated to complete the total gelling or fusion, after which it is suitably cooled and the finished product is extracted from the mold, which can then recommence its production cycle.

In the slush molding process as discussed above, it should be noted that the shape of the finished article can assume more complex forms, particularly in motor vehicle applications for the manufacture of internal parts such as dash panels and linings. Consequently, the separation line between the two colors of the finished article, and hence the corresponding mold profile and gasket, have to follow a rather complete pattern which includes grooves, projections and undercuts.

For these reasons, a further object of the present invention is to effectively solve the technical problem of providing an optimum gasket seal even for complex mold shapes, and in particular for those with an undercut profile.

This object is obtained by providing an inventive method for making a molded two-colored article which includes the steps of a) providing a mold having an inner surface;

b) providing a gasket having a profile which is approximately the same as a profile of a corresponding region of the mold inner surface;

c) providing rigid material inserts in the gasket;

d) fixing the gasket to a separation wall having a chamber therein;

e) inserting the gasket and the separation wall into the mold, and aligning the gasket along the corresponding region of the mold inner surface to create a seal between the mold inner surface and the separation wall and to define first and second half-spaces within the mold that are sealed from each other;

f) compressing the gasket against the corresponding region of the mold utilizing a mechanical device;

g) slush molding a layer of a first colored material within the first half-space, the layer of the first colored material only adhering to walls defining the first half-space;

h) consolidating the layer of the first colored material;

i) removing the gasket and the separation wall from the mold;

j) slush molding a continuous layer of a second colored material within the mold, thereby producing the molded two-colored article which includes the layer of the first colored material, the continuous layer of the second colored material, and a separation line between the layer of the first colored material and the continuous layer of the second colored material.

The present invention also provides for a gasket having the profile of a mold for slush molding articles of two or more colors (such as simulated leather products or the like) from materials chosen from thermoplastic, thermosetting and elastomeric resins in powder form. The profile of the gasket is the same as the profile of the mold along that portion of the mold corresponding to the separation line between two different colors. The gasket is fixed to a separation wall which defines two separated half-spaces within the mold, and includes a plurality of rigid material inserts arranged in the gasket in a predetermined distribution. Each insert is independently controlled by an actuator device to enable the gasket to undergo expansion or retraction movements by operating the inserts.

BRIEF DESCRIPTION OF THE DRAWINGS

The characteristics and advantages of the present invention will be more apparent from the description of the following embodiments making reference to the accompanying drawings.

FIGS. 4, 5 and 6 are cross-sectional views showing in succession the stages in the implementation of the method of the present invention, FIG. 7 shows a finished article resulting from the method of the invention, and which has been extracted from the mold.

DETAILED DESCRIPTION OF THE PREFERRED EMBODIMENTS

Figure 1:
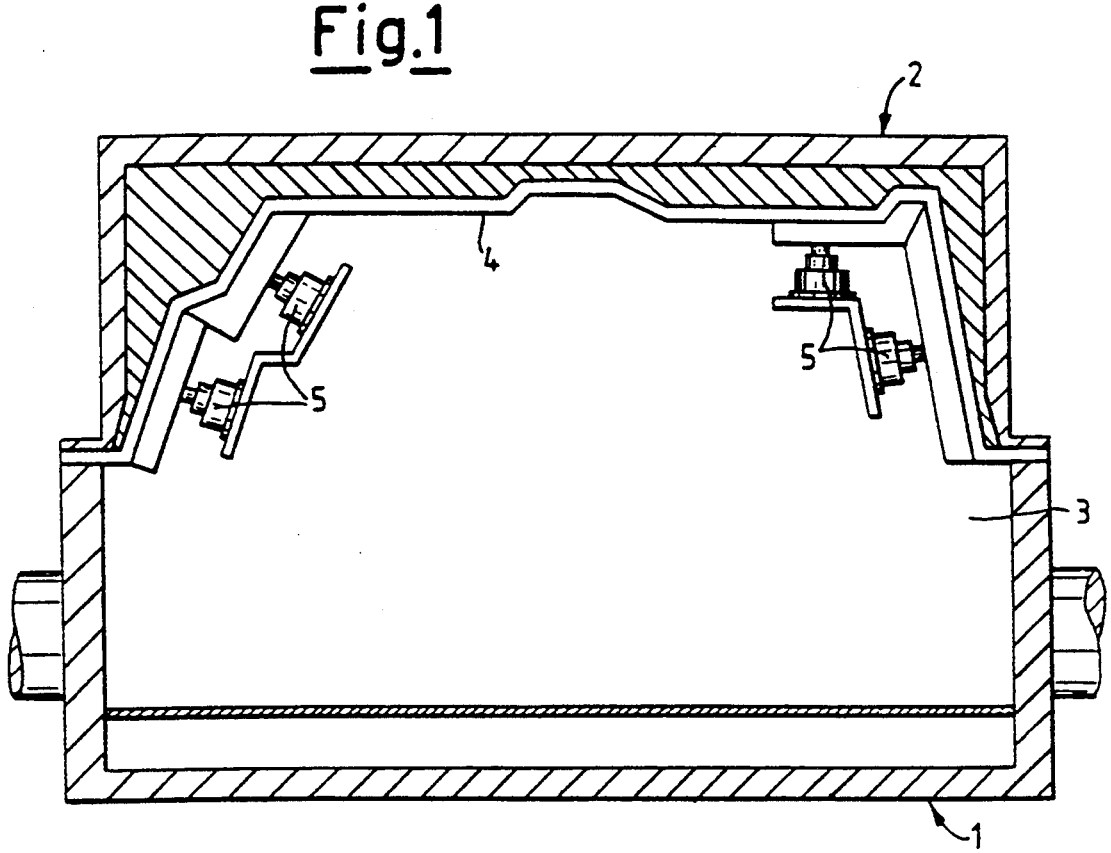
FIG. 1 is a cross-section through a mold of the invention mounted on a slush molding tank.

In FIG. 1 the reference numeral 1 indicates a slush molding tank on which a mold 2 is mounted in an operating position.

The tank 1 is divided longitudinally into two parts by a vertical wall 3 which extends into the mold overlying the tank so as to define in the mold 2 two half-spaces indicated by 22 and 23 in FIG. 4. The upper profile of the wall 3 which extends into the mold 2, is substantially the same as the shape of that region of the mold within which this wall lies.

Figure 2:
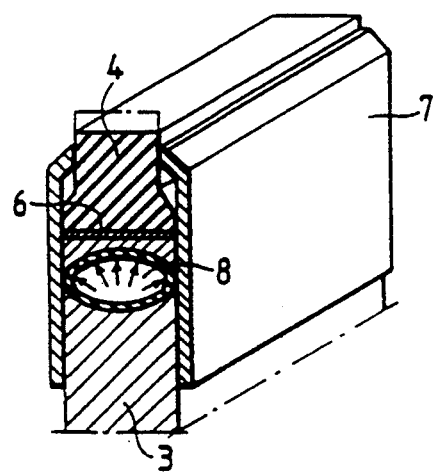
FIG. 2 is a perspective sectional view of a detail of a first embodiment of the gasket mounted on the tank.
Figure 3:
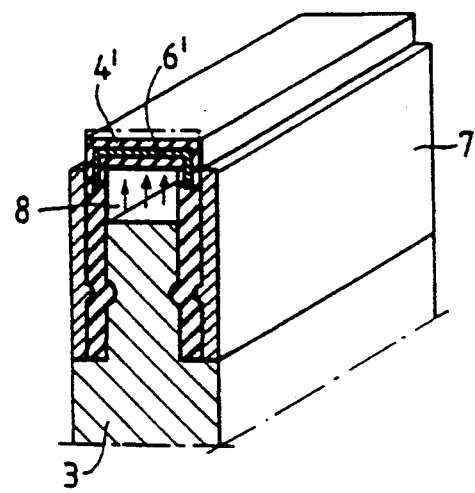
FIG. 3 is a perspective sectional view of a detail of a further embodiment of the gasket of the invention mounted on the tank.

Along the perimeter of the dividing wall 3 which cooperates with the mold 2 there is fixed a gasket 4 for forming a seal between the two half-spaces 22 and 23. The gasket 4 can be of various cross-sections. For example, FIG. 2 shows a gasket 4 of substantially trapezoidal cross-section within which a metal insert 6 is incorporated for stiffening the gasket 4. FIG. 3 shows a modified gasket 4' of substantially C-shaped cross-section within which a stiffening insert 6' is provided. To enable the gasket to be fixed onto the dividing wall 3, a fixing section 7 is provided and is forced over the dividing wall 3 in order to clamp the gasket 4 in place. Various means can be provided to obtain a perfect seal between the gasket 4 and the corresponding mold line against which the gasket is to act. For example, FIG. 1 shows mechanical means 5 mounted on the dividing wall 3 for compressing the gasket 4 against the mold wall.

In contrast, the means shown in FIGS. 2 and 3 for compressing the gasket against the mold wall are air chambers 8 into which compressed air is fed via suitable nozzles below the gasket 4 or 4' in order to urge the gasket 4, 4' against the mold wall and hence optimize the seal.

FIGS. 4 and 5 show the operation of the structure of FIG. 1 in two successive positions. In these Figures, the longitudinal half of the tank 1 corresponding to the half-space 22 of the mold is filled with a first plastic material 10 suitable for slush molding, the first plastic material constituting the first color of the article.

FIG. 6 shows the next operating stage, in which the mold 2 is mounted on a second tank 9. Tank 9 does not have a dividing wall and is filled with a second plastic material 11 suitable for slush molding and constituting the second color of the finished article.

In FIG. 7 the reference numeral 15 shows the finished article after leaving the mold 2. The finished article 15 includes a layer 12 consisting of the first color from the material 10, and a layer 13 consisting of the second color derived from the material 11. The two layers 12 and 13 are separated from each other along a separation line 14.

Figure 8:
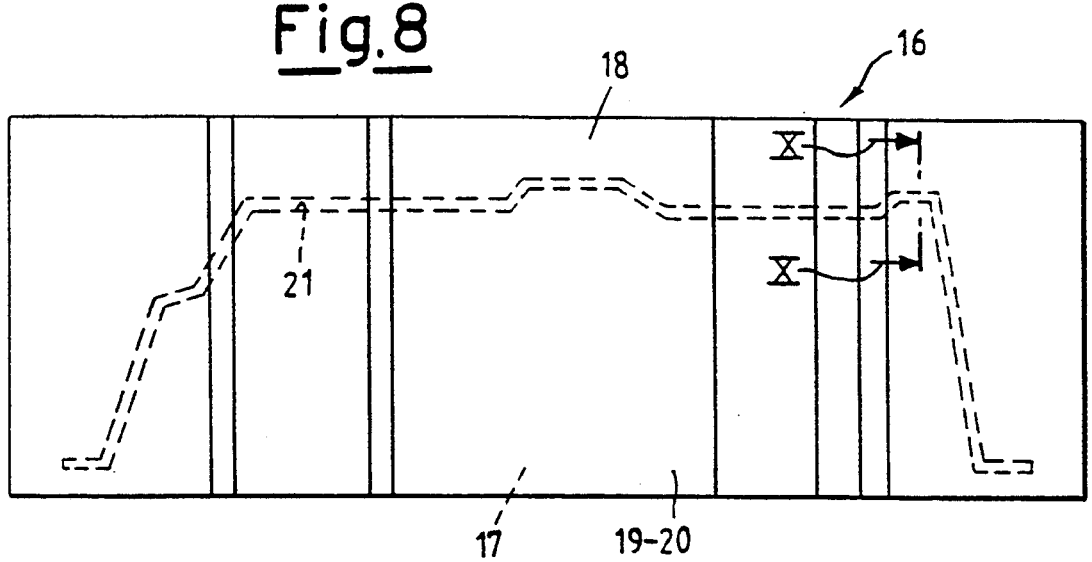
FIG. 8 shows a form or mold for forming a gasket suitable for the method of the invention.

FIG. 8 shows a form or mold 16 for forming the gasket according to the method of the invention, in which a space 21 is defined between two parts of half-molds 17, 18 and 19, 20 which exactly corresponds to the profile of the mold 2 of FIG. 1 along the separation line 14 of the finished article 15 as shown in FIG. 7.

Figure 10:
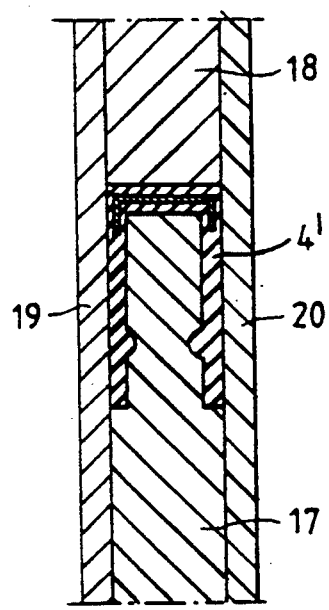
FIG. 10 is a section on the line X—X of FIG. 8.
Figure 11:
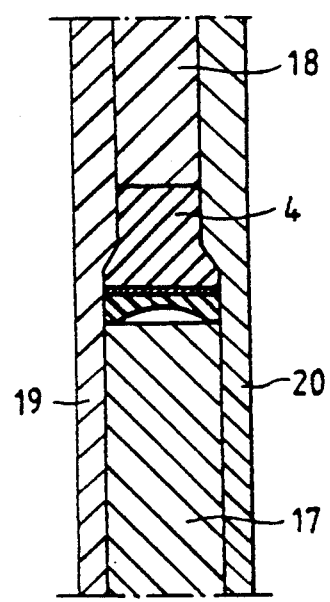
FIG. 11 is a view analogous to FIG. 10, showing a further embodiment of the invention.

FIG. 10 shows the forming of the gasket 4' in the embodiment of FIG. 3, while FIG. 11 shows the forming of the gasket 4 in the embodiment of FIG. 2.

Figure 9:
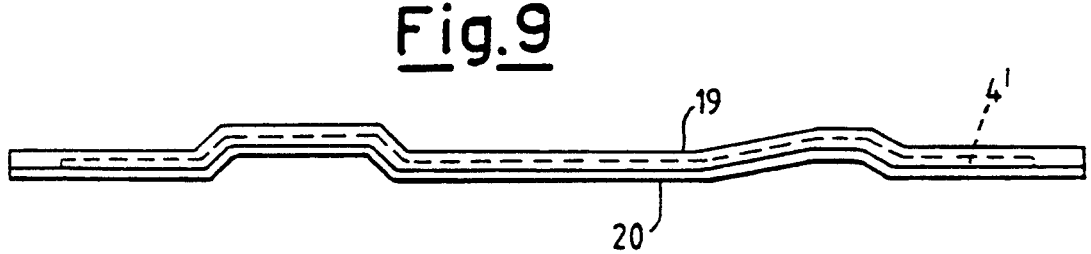
FIG. 9 shows a detail of FIG. 8.

Finally, FIG. 9 is a full view of the gasket 4' as obtained from the forming mold 16. The shape of the gasket 4' is exactly the same as the profile of the forming mold 2 for the finished article.

The operation of the structures shown in the aforedescribed figures is as follows. Having defined the separation line 14 between the two colors in the finished article 15 on the basis of production requirements, this line must be made to correspond in terms of its shape and design exactly to the mold profile in that region in which the gasket is to be mounted. To achieve this, the gasket can either be molded in a form or mold of the type shown in FIG. 8, in which the forming space 21 corresponds exactly to the profile of the article mold 2 shown in FIG. 1, or be directly formed in the actual mold 2 shown in FIG. 1, in the region in which the separation line between the two different colors is defined. The gasket, if necessary, can be obtained from forms having different dimensions in comparison with those of the mold 2 since this can prove to be helpful. For instance, the dimensions of the form can be slightly enlarged.

The gasket 4 is obtained by molding liquid silicone rubber in the mold of FIG. 8 or in the mold of FIG. 1. Before molding, stiffening inserts of the type 6 or 6' are embedded in the molding material to better distribute the thrust of the gasket against the mold 2 during the operation when a seal is required.

Having prepared the gasket 4 (or 4') it is mounted for operational purposes as shown in FIGS. 1, 2 and 3, by either forcing it directly onto the dividing wall 3 or fixing it by a fixing means. The half of the tank 1 corresponding to the half-space 22 is then filled with a first plastic material 10, after which slush molding is carried out as shown in FIGS. 4 and 5.

In this manner, a first layer 12 is formed of the material 10 constituting the first color of the finished article. When this first layer 12 has been consolidated, the mold 2 is coupled if required, with the aid of driving means, with a second tank 9 as shown in FIG. 6. This time the second tank 9 is completely filled with a plastic material 11 of a different color from the first. Slush molding is now carried out with this second material 11. The second material 11 is able to adhere to the wall of mold 2 which remains uncovered after deposition of the layer 12 of the first material. When molding is complete the finished article has the form shown in FIG. 7, and includes a first layer 12 and a second layer 13 separated along the separation line 14.

During those stages of the method shown in FIGS. 4 and 5, gasket thrust means such as the pneumatic means shown in FIGS. 2 and 3 or the mechanical means shown in FIGS. 1 and 4, or both types of gasket compressing means, are suitably operated. That is, in FIGS. 2 and 3, compressed air is forced through the chamber 8 and against the gasket 4 such that the gasket is compressed against the mold 2. The sealing performed by the gasket can be further improved by means of suitable devices, such as for instance vacuum means applied to the tank portion containing the plastic material.

Figure 12:
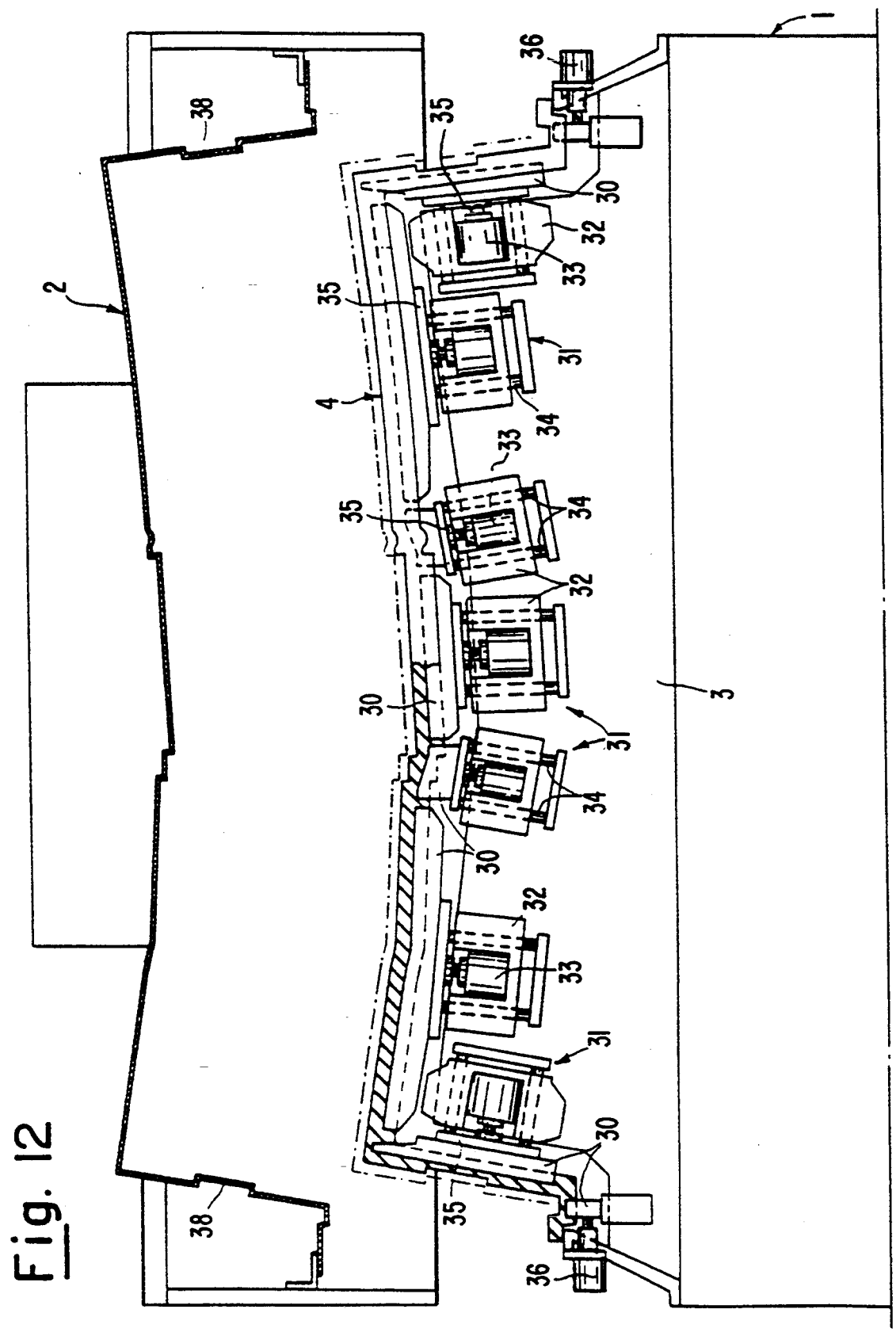
FIG. 12 is a partial sectional view of a molding apparatus suitable for implementing the method of the invention, showing an operating position where the mold is not engaged with the gasket.

In FIG. 12, the reference numeral 1 indicates a slush molding tank facing a mold 2 which is shown in a position in which it is undergoing translational movement. The tank is divided longitudinally into two parts by a vertical/dividing wall 3 which extends into the tank 1 and, when in the closure position shown in FIG. 14, also extends into an overlying mold so as to define in the overlying mold 2, two half-spaces indicated by numerals 22 and 23 in FIG. 15. Along the entire edge of the separation wall 3 facing the mold 2 there is fixed a gasket 4 which seals the two half-spaces 22 and 23 from each other.

The gasket 4 has the same profile as the mold 2 along that line on the mold 2 which defines on the final molded article the corresponding separation line between two different colors derived from suitable plastics powder contained in tank 1. The gasket 4 is provided with a plurality of inserts 30 of rigid material, such as metal, of different shapes and dimensions depending on the point in which they are inserted into the gasket 4. The distribution of these inserts 30 within the gasket is determined by its shape. Each of the inserts 30 is independently supported and controlled by actuator devices 31 which can be either mechanical, hydraulic or pneumatic.

Figure 15:
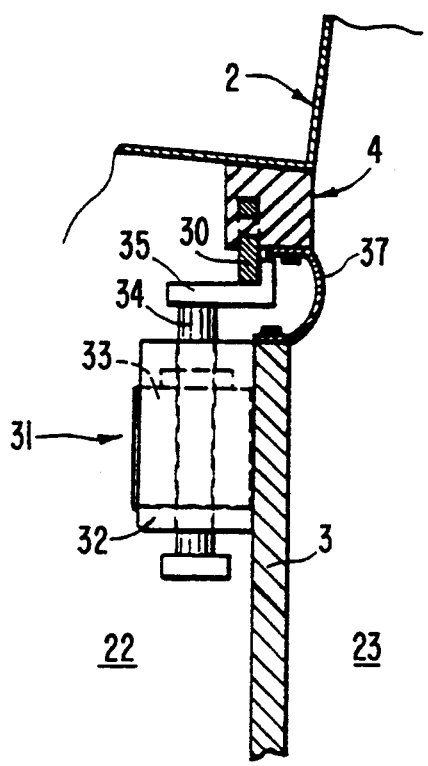
FIG. 15 is a section on the line XV—XV of FIG. 3.

As will be more apparent from the sectional view of FIG. 15, each of the actuators 31 consists of a casing 32 rigid with the wall 3 and housing a piston 33 with guide rods 34 and operating a plate 35 fixed to the inserts 30, which are embedded in the gasket 4 and which project therefrom. Actuators 36 are also provided in the perimeter region of the tank 1 to control the movement of the inserts in the end region of the gasket 4.

The seal between the separation wall 3 and the gasket 4 in the region in which the actuators 31 act is achieved by an elastic seal such as a bellows wall 37.

The operation of the structure as mounted in the aforedescribed figures is substantially as follows: when the separation line between the two colors has been defined in the finished article in accordance with production requirements, this separation line must exactly correspond in form and pattern to the profile of the mold 2 in that region in which the gasket 4 is to be mounted. This gasket can either be molded in a separate mold or be formed directly in the mold 2 in the region in which the separation line between the two different colors is defined.

The gasket 4 is formed by casting liquid silicon rubber after embedding the inserts 30 in it before molding. The inserts have a shape, size and distribution which is determined by the pattern of the profile of the mold with which the gasket 4 is to mate. The gasket is then associated with the separation wall 3 of the tank 1 carrying the actuator means 31, in the manner essentially as shown in FIG. 15.

FIG. 1 shows the relative positions of the mold 2 and tank 1 carrying the gasket 4 in the initial operating stage, in which the mold 4 is descending onto the tank 1.

In this operating stage, the gasket 4 is shown by full lines in a position in which it is retracted from its normal position, which is instead shown by dashed and dotted lines (substantially equivalent to the mold position after closure). The retracted position is achieved by operating the actuator devices 31 so that they move into their contracted position shown in FIG. 13.

In the embodiment shown in the figures, the profile of the mold 2 which is to mate with the gasket 4 includes various undercut regions indicated by numeral 38.

It is apparent that if mold 2 were mounted on the separation wall 3 of the tank 1 without first retracting the gasket 4, there would be interference between these undercut regions 38 and the gasket 4, so that it would not be possible to obtain a seal between them. Thus, these undercuts 38 determine regions of evident interference and hence of possible sealing discontinuities.

For these reasons, during the initial descent of the mold 2, the gasket 4 is retracted as shown in FIG. 1, into the position shown by full lines. With the gasket 4 in this retracted position, the mold 2 is lowered completely onto the tank 1 to the final position shown in FIG. 13.

Figure 13:
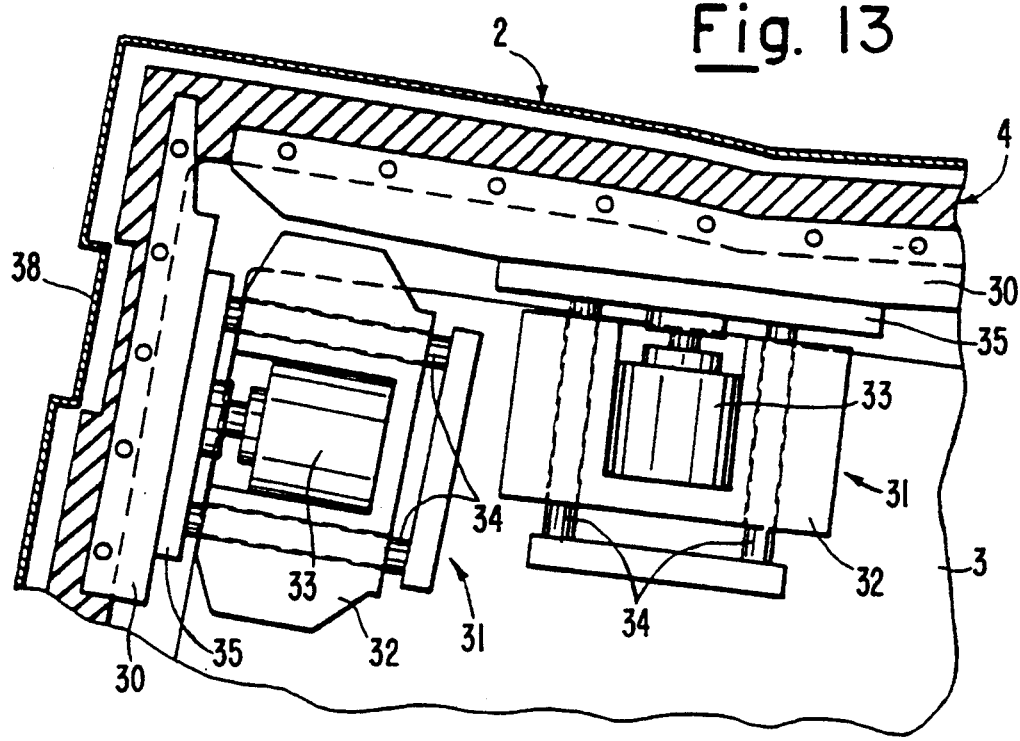
FIG. 13 is a detail of a left side portion of FIG. 1.

In FIG. 13, gasket 4 is in a position retracted from its normal position and the mold 2 can descend completely to its closed position on the tank 1 with no interference occurring, even in the undercut regions 38. Having reached this position in which the mold 2 is closed on tank 1, the actuators 31 are operated to expand the gasket until it reaches the final position shown in FIG. 14, in which the gasket 4 is compressed against the corresponding profiled region on the mold 2.

Figure 14:
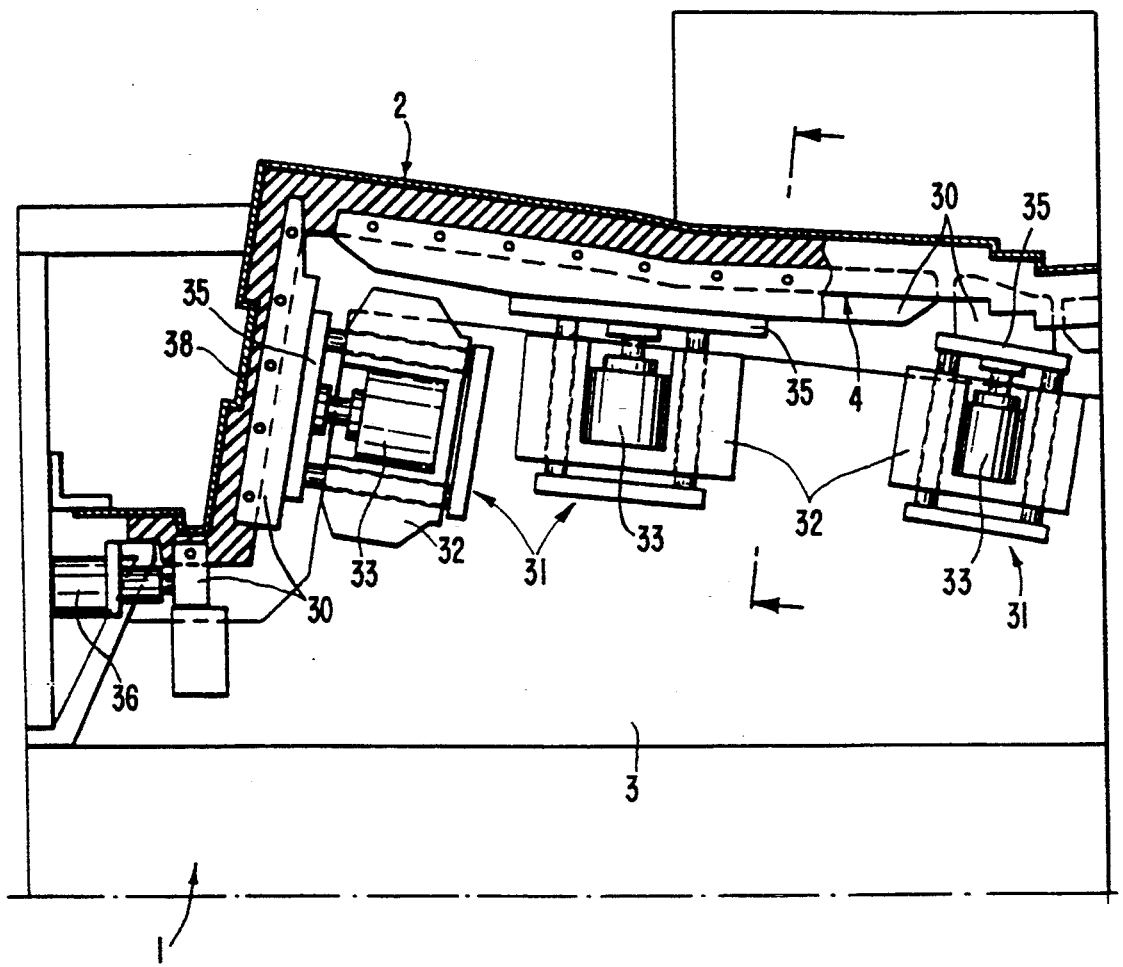
FIG. 14 is a detail of a left side portion of the apparatus of FIG. 1 in an operating position where the mold is engaged with the gasket.

The compression of the gasket 4 against the mold 2 as shown in FIG. 14, enables a perfect seal to be achieved along every region of contact between the gasket 4 and mold 2 thereby perfectly sealing the half-spaces 22 and 23 from each other. Hence, the position shown in FIG. 14 is that of the mold 2 which is ready for the molding operation.

For the subsequent steps in the molding process reference should be made to the description provided for FIGS. 1–11 presented herein.

The invention enables an ideal gasket to be constructed for use in the inventive process. The gasket is able to form a perfect seal at any region of the mold profile, including positions which typically are particularly difficult to seal due to the presence of undercuts, grooves or projections on the inner wall of the mold being sealed.

The sealing effect is made possible by the action of the actuators on the gasket via the metal inserts embedded in the gasket. The metal inserts having the effect of distributing the actuator thrust along the gasket in a uniform and ideal manner.

It should be noted that the aforesaid description with reference to the accompanying drawings in no way limits the scope of the invention, which can undergo numerous modifications with respect to that described and illustrated in the figures. For example, numerous modifications are possible in the form of the seal gasket according to the present invention and in the manner of fixing the gasket to the dividing wall provided in the mold for forming the article. The method of the invention is suitable for preparing multi-colored articles, in which case those modifications necessary to enable successive deposition of a number of layers of different materials of different color have to be made to the described method.

From the foregoing it is apparent that the method of the invention represents an effective method for molding articles such as simulated leather products, for example for the automobile industry, with different colored portions. The method of the invention is highly advantageous in its practical implementation and the articles obtained have very high quality characteristics.

What is claimed is:

1. A method of making a molded two-colored article comprising the steps of:
    a) providing a mold having an inner surface;
    b) providing a gasket having a profile which is approximately the same as a profile of a corresponding region of the mold inner surface;
    c) providing rigid material inserts in the gasket;
    d) fixing the gasket to a separation wall;
    e) inserting the gasket and the separation wall into the mold, and aligning the gasket along the corresponding region of the mold inner surface to create a seal between the mold inner surface and the separation wall and to define first and second half-spaces within the mold that are sealed from each other;
    f) compressing the gasket against the corresponding region of the mold utilizing a mechanical device operatively engaging the rigid inserts;
    g) slush molding a layer of a first colored material within the first half-space, the layer of the first colored material only adhering to walls defining the first half-space;
    h) consolidating the layer of the first colored material;
    i) removing the gasket and the separation wall from the mold; and
    j) slush molding a continuous layer of a second colored material within the mold, thereby producing the molded two-colored article which includes the layer of the first colored material, the continuous layer of the second colored material, and a separation line between the layer of the first colored material and the continuous layer of the second colored material.

2. A method as recited in claim 1, further comprising distributing thrust of the compressing step along the gasket via the rigid inserts disposed in the gasket and controllably compressing and retracting the gasket via an actuator control device which operatively engages the rigid inserts.

3. A method as recited in claim 2, further comprising engaging the actuator control device with portions of the rigid inserts that project outward from the gasket.

4. A method as recited in claim 2, further comprising engaging a piston of the actuator control device with a plate connected to the rigid inserts and controllably compressing and retracting the gasket by moving the piston.

5. A method, of making a molded two-colored article comprising the steps of:
    a) providing a mold having an inner surface;
    b) providing a gasket having a profile which is approximately the same as a profile of a corresponding region of the mold inner surface;
    c) providing rigid material inserts in the gasket;
    d) fixing the gasket to a separation wall;
    e) inserting the gasket and the separation wall into the mold, and aligning the gasket along the corresponding region of the mold inner surface to create a seal between the mold inner surface and the separation wall and to define first and second half-spaces within the mold that are sealed from each other;
    f) compressing the gasket against the corresponding region of the mold utilizing a mechanical device;
    g) slush molding a layer of a first colored material within the first half-space, the layer of the first colored material only adhering to walls defining the first half-space;

h) consolidating the layer of the first colored material;

i) removing the gasket and the separation wall from the mold; and j) slush molding a continuous layer of a second colored material within the mold, thereby producing the molded two-colored article which includes the layer of the first colored material, the continuous layer of the second colored material, and a separation line between the layer of the first colored material and the continuous layer of the second colored material;

further comprising distributing thrust of the compressing step along the gasket via the rigid inserts disposed in the gasket and controllably compressing and retracting the gasket via an actuator control device which operatively engages the rigid inserts; and further comprising interposing an elastic seal between the gasket and the separation wall in an area where the actuator control device engages the rigid inserts, thereby maintaining sealing between the first and second half-spaces in the area during compressing and retracting of the gasket.

* * * * *

UNITED STATES PATENT AND TRADEMARK OFFICE
CERTIFICATE OF CORRECTION

PATENT NO. : 5,395,578
DATED : March 7, 1995
INVENTOR(S) : Buzzoni, et al.

It is certified that error appears in the above-indentified patent and that said Letters Patent is hereby corrected as shown below:

```
On title page, insert the following:

Item
[30]  Foreign Application Priority Data

Sep. 17, 1990  [IT]  Italy........21488/90
  Dec.  1, 1992  [IT]  Italy........002752/92
```

Signed and Sealed this

Twenty-seventh Day of February, 1996

Attest:

BRUCE LEHMAN

*Attesting Officer*     *Commissioner of Patents and Trademarks*